United States Patent [19]
Matsunami et al.

[11] Patent Number: 6,006,308
[45] Date of Patent: Dec. 21, 1999

[54] REMOVABLE LIBRARY MEDIA SYSTEM UTILIZING REDUNDANT DATA STORAGE AND ERROR DETECTION AND CORRECTION

[75] Inventors: Naoto Matsunami; Akira Yamamoto, both of Sagamihara, Japan

[73] Assignee: Hitachi, Ltd., Tokyo, Japan

[21] Appl. No.: 09/042,149

[22] Filed: Mar. 13, 1998

[30] Foreign Application Priority Data

Mar. 14, 1997 [JP] Japan .................................. 9-060513

[51] Int. Cl.⁶ .......................... G06F 11/10; G06F 11/16; G06F 11/20
[52] U.S. Cl. ................................ 711/114; 714/5; 714/6; 714/7; 714/8; 714/52; 714/710; 714/769; 714/805; 711/4; 711/5; 711/112; 711/115; 711/170
[58] Field of Search .................................. 711/1, 2, 4, 5, 711/111, 112, 114, 115, 148, 153, 161, 162, 170, 173, 202, 205, 206, 207, 208; 714/5, 6, 7, 8, 20, 42, 47, 48, 49, 50, 52, 54, 710, 746, 747, 758, 764, 768, 769, 770, 771, 799, 800, 801; 707/202, 204; 360/69

[56] References Cited

U.S. PATENT DOCUMENTS

| | | |
|---|---|---|
| 4,404,647 | 9/1983 | Jones et al. ............................ 364/927.8 |
| 4,434,487 | 2/1984 | Rubinson et al. ....................... 714/710 |
| 5,351,246 | 9/1994 | Blaum et al. ................................ 714/6 |
| 5,390,327 | 2/1995 | Lubbers et al. .......................... 714/770 |
| 5,488,701 | 1/1996 | Brady et al. ............................. 714/710 |
| 5,574,855 | 11/1996 | Rosich et al. .............................. 714/42 |
| 5,581,715 | 12/1996 | Verinsky et al. ......................... 710/129 |
| 5,649,090 | 7/1997 | Edwards et al. ........................... 714/54 |
| 5,752,257 | 5/1998 | Ripoll et al. ............................. 711/114 |
| 5,784,394 | 7/1998 | Alvarez, II et al. ..................... 714/799 |

OTHER PUBLICATIONS

A Case for Redundant Arrays of Inexpensive Disks (RAID), I Proc. ACM SIGMOD Jun., 1998, issued by University of California at Berkley.

COMDEX 96, DVD applications, by Alan E. Bell (IBM Research Division), Nov. 20, 1996.

*Primary Examiner*—B. James Peikari
*Attorney, Agent, or Firm*—Antonelli, Terry, Stout & Kraus, LLP

[57] ABSTRACT

A library storage system is implemented to comprise a redundant array of inexpensive libraries (RAIL). The system includes removable storage media which may be logically configured into groups (libraries) and subgroups (media groups), such that each may element may be identified and referenced by number. The configuration of libraries allows for redundant data storage as well as error detection and correction via parity schemes. When substitution of storage media is performed, a RAIL controller inspects the appropriate libraries (by matching ID numbers) to ensure that substitute media are stored in the correct locations.

8 Claims, 12 Drawing Sheets

FIG. 11

| | LIBRARY 400 | LIBRARY 401 | LIBRARY 402 | LIBRARY 403 | LIBRARY 404 |
|---|---|---|---|---|---|
| STORING LOCATION 0 | FINAL STORING | FINAL STORING | FINAL STORING | FINAL STORING | FINAL STORING |
| STORING LOCATION 1 | FINAL STORING | FINAL STORING | FINAL STORING | FINAL STORING | FINAL STORING |
| STORING LOCATION 2 | PROVISIONAL STORING | FINAL STORING | FINAL STORING | FINAL STORING | FINAL STORING |
| STORING LOCATION 3 | PROVISIONAL STORING | FINAL STORING | FINAL STORING | FINAL STORING | FINAL STORING |
| STORING LOCATION 4 | PROVISIONAL STORING | FINAL STORING | FINAL STORING | FINAL STORING | FINAL STORING |
| ... | ... | ... | ... | ... | ... |
| STORING LOCATION n | PROVISIONAL STORING | FINAL STORING | FINAL STORING | FINAL STORING | FINAL STORING |

6101

MEDIA STORING MANAGEMENT TABLE

REDUNDANT LIBRARY SYSTEM

REMOVABLE LIBRARY MEDIA SYSTEM UTILIZING REDUNDANT DATA STORAGE AND ERROR DETECTION AND CORRECTION

BACKGROUND OF THE INVENTION

The present invention relates to a storage system having high availability in which a removable medium is stored, more particularly, to a storage system in which each of component elements has redundancy for improving availability.

(1) Description of RAID

A disk array is a technique for operating a plurality of disks in parallel to thereby realize high speed operation as compared with a single disk. When (n) disks are arranged, however, the failure probability deteriorates by (n) times. As a technique for realizing both of high speed and high reliability, "RAID (Redundant Arrays of Inexpensive Disks)" is known. RAID is described in detail in "A Case for Redundant Arrays of Inexpensive Disks (RAID)", In Proc. ACM SIGMOD, June, 1998, issued by University of California at Berkeley.

FIG. 1 shows the construction of RAID. Reference numeral 1 denotes a host computer and 2 indicates RAID which are connected by a host interface 11. The RAID 2 comprises an RAID controller 3 for controlling the RAID and a plurality of disks 210 to 214. The RAID controller 3 controls the plurality of disk apparatus 210 to 214 and executes reading and writing operations of data in data arrangement of FIG. 1. The RAID control means 3 controls generation of a parity and reconstructing data of a failed disk.

The RAID has levels 1 to 5 in accordance with methods of storing the parity. FIG. 2 shows data arrangement of RAID of the level 4 as an example. According to the example, there are five disk apparatus. When four disk apparatus are used as data disk apparatus 210 to 213 and one disk apparatus 214 is used as a parity disk apparatus, data is sequentially dispersed and stored on a predetermined data block unit basis in accordance with the order of disk apparatus 210, disk apparatus 211, disk apparatus 212, and disk apparatus 213. The data block unit is called a stripe and a control of dispersing data is called striping. By obtaining exclusive OR (hereinbelow, called "XOR") of the data D0 to D3 in the same stripe stored in the disk apparatus 210 to 213, parity P0 as redundant data is generated as follows.

$$P0 = D0 + D1 + D2 + D3 \qquad \text{(Equation a)}$$

where, + denotes XOR operation.

When the disk apparatus 210 for storing D0 is failed, D0 of the failed disk apparatus can be reproduced by the following.

$$D0 = D1 + D2 + D3 + P0 \qquad \text{(Equation b)}$$

Data in the same column for generating a parity and a group of parity stripes is called a "parity group". In case of FIG. 2, D0, D1, D2, D3, and P0 form the same parity group. Except for RAID4, RAID3 and RAID5 generate the parity by the same method using the equation a.

The RAID is a method of controlling disks which can enhance reliability at the time of disk failure in the following manner. By realizing high-speed control by operating a plurality of disks in parallel and storing redundant data called a parity into a specific disk called a parity disk, even if one of the disks for storing data is failed, data of the failed disk can be reproduced from other disks and the parity of the parity disk.

(2) Description of removable media (DVD)

In a computer system, as storage often used as well as a disk storage, there is a magnetic tape storage, an optical disk storage. The feature of those storage is that a storage medium and a recording and reproducing apparatus are separated, the storage medium is loaded in the recording and reproducing apparatus, and data is read and written from/to the storage medium. Generally, these media are called "removable media", which will be simply called "media" hereinbelow. In a large-scale computer system, in order to easily manage a great number of media, a library apparatus is introduced. In addition to the storage media and the recording and reproducing apparatus, the library apparatus includes a storage for storing a number of memory media and a carrying apparatus for transferring the memory media between the storage and the recording and reproducing apparatus.

As one of the removable media, there is a DVD (Digital Video Disk). The DVD is a kind of optical disks and a removable medium having characteristics of large capacity, low price, and rewritability. It has been developed so as to be mainly applied to a digital video apparatus. The DVD can be also used in computers and attention is paid to application to various computers by making most of the features such as distribution of programs and data, backup performance of data, and substitution of a magnetic disk.

(3) Description of RAIL

Since the scale of data used in a computer system is being increased, improvement in its availability is very strongly requested. In a storage system constructed by the above removable media, it is effective to realize high availability by applying the concept proposed in the literature by Patterson.

As a technique employing the concept in the removable media, there is COMDEX 96, DVD applications, by Alan E. Bell (IBM Research Division), Nov. 20, 1996. In the literature, RAIL (Redundant Arrays of Inexpensive Libraries) having redundancy by combining a plurality of ordinary libraries each constructed by DVD, recording and reproducing means, carrying means, and the like is proposed.

In the RAIL, it is considered that one of libraries as a component element does not have redundancy since it is an ordinary library (inexpensive library). The concept of the RAIL is that a library itself is considered as one disk and a unit of redundancy is a library, not that redundancy is given to each of the means constructing the library. That is, even if one of libraries is failed, data of the DVD stored in the failed library can be reproduced from data of DVDs stored in a plurality of other libraries by the same method as the Equation (b) in the (1) description of the RAID. As mentioned above, the RAIL is a technique for realizing high reliability of libraries using removable media.

In order to simplify the description, RAIL of a type of the RAID4 is considered in the specification. It is obviously understood that RAIDs at other levels have similar operations. In a manner similar to other levels of the RAID, it is assumed that data is divided on a predetermined block unit basis and is dispersed into media in different libraries. The dividing unit at this time is a "stripe" in a manner similar to that of the RAID. Data stripes in the same column for generating a parity and a parity stripe are called a "parity group". Since RAID4 is used, all the parities are concentratedly arranged in the same medium. The medium for storing the parity is called a "parity medium".

A group of libraries for providing redundancy is called a "RAIL group". A group of media constructing an ECC group is called a "media group".

PROBLEMS TO BE SOLVED BY THE INVENTION (1) Substitution of media at the time of library substitution In the RAIL, a library can store tens to hundreds of media. Once the library is substituted, however, all of the media stored in the failed library have to be re-stored in proper locations (the same locations as stored locations in the failed library) in a new library. If the location to store the medium is wrong, the "media group" as an ECC group constructed with media stored in other libraries cannot be correctly constructed. Consequently, there are problems such that matching of data stored in the media group is lost, correct reading and writing operations cannot be performed, and data is lost.

(2) Substitution of medium during on-line operation of RAIL

A host computer to which the RAIL is connected is often a computer called a server which receives requests from a number of client computers and provides on-line service of the libraries. Since the server is requested to have high availability such as 24 hours continuous operation, even when a library in the RAIL is failed, the RAIL cannot be usually stopped in order to recover the medium. Consequently, substitution of a medium during the on-line operation of the RAIL together with substitution of the failed library by a new library is an object.

SUMMARY OF THE INVENTION

A first object of the invention is to provide a library system with redundancy including RAIL, comprising: a plurality of recording and reproducing apparatuses; a plurality of storing means for storing a plurality of media; at least one carrying means of media; and at least one inserting means for inserting media. When a failure occurs in an arbitrary storing means (a library in the RAIL), it is necessary to restore a number of media together with substitution of the failed storing means (failed library in the RAIL). In this case, a method of confirming the storage locations of the media and a method of correcting the storage if the medium is erroneously stored are provided, thereby preventing data loss by a mismatch of the "media group" due to erroneous storage.

A second object of the invention is to provide a method which can simultaneously and parallelly perform reading/writing service of a library system with redundancy and a recovery process of a failed storing means (failed library apparatus in the RAIL) by confirming and correcting the storage location at the time of the media substitution of the first object during an "on-line" process in which the library system with redundancy provides the reading/writing service.

According to a feature of the invention, a library system with redundancy connected to a host computer is provided, which comprises:

a plurality of recording and reproducing means arranged on an array for recording and reproducing data to/from a plurality of removable media;

a plurality of substitutable storing means arranged on an array, which have storage locations in which the plurality of removable media can be stored;

at least one inserting means for inserting the removable media into the storing means;

at least one carrying means for carrying the removable media among the inserting means, the storing means, and the recording and reproducing means; and a controller for controlling so that the plurality of recording and reproducing means operate in parallel, wherein the plurality of media stored in the plurality of different storing means construct a "media group" as an ECC group, and redundant data generated from data of other media is stored into at least one medium in the same media group.

The medium has a media group identification number constructing the media group, a storing means number used for storing the medium, and a media group information storing part for storing the storing location number of the storing means for storing the medium.

The controller includes: host connecting means for connecting a host computer; at least one memory connecting means for connecting the plurality of recording and reproducing means and for transferring data with media; at least one carrying means connecting means for controlling the carrying means; redundant data calculating means for generating a parity stored in the parity medium and restoring data of a failed medium or data in a medium stored in a failed library; central control means for controlling the whole controller; storing means failure detecting means for detecting occurrence of a failure in an arbitrary storing means; and media inspection means which controls in such a manner that when a medium is substituted together with substitution of the failed storing means by new storing means, a media storage location number of the media group information stored in each medium is referred to, and the medium is stored into the storage location shown by the number.

With the above configuration, when a failure occurs in an arbitrary storing means constructing the library system with redundancy, the controller detects the failed storing means, blocks the failed storing means, and shifts to degeneration operation for performing reading/writing processes while reproducing the data of the failed storing means from the data and the parities of the data of other normal storing means.

After that, the user substitutes the failure storing means with a new storing means.

The user inserts one of the media stored in the failed storing means into the inserting means.

The controller carries the inserted medium, loads the medium into one of the plurality of the recording and reproducing means, which is not used for on-line process from the host computer, inspects the media storage location number stored in the medium, carries and stores the inserted medium to the storage location indicated by the inspected media storage location number, checks whether all of the media have been stored in the new storing means or not, and repeats the steps from the insertion to the storage of the media if the storage is not completed.

When the storage of all of the media is finished, the controller carries media of the media group being used in the on-line process instructed by the host from the new storing mean, loads them into a recording and reproducing means which is not used in the on-line process, and returns the operation from the degeneration operation to the normal operation.

As mentioned above, since the storage location information of the storing means to which the medium has to be stored is stored in the medium, the controller checks the information and the medium can be stored in a proper location. Thus, the medium is not stored in an erroneous storage location.

The above method has, however, a problem such that a number of media have to be sequentially inserted by a human and attendance time of the human is long. Consequently, all of the media are continuously inserted into the storing means or the human directly moves and stores all of the media in the failed storing means to storing means in new storing means, and after that, the controller can sequentially confirm the storing locations of all of the media. In this case, since the confirming work needs the user's help, labor can be saved.

When all of the media are inserted at once, there is a case that the media are inserted into wrong locations by a mistake of a person. In this case, the media inspecting means of the controller rearranges the media to the proper locations by referring to the storing location numbers of the media group information stored in the media. Although the media inspecting means tries to store the medium to the correct location, another medium is already stored. Consequently, the carrying means is controlled to temporarily save the another medium and, after that, the medium is stored in the correct location. As a save area, since the area in which the present medium had been stored is empty, the area may be used. Another temporal storing area may be also prepared. As methods of rearrangement, there are a heuristic method and a well known rearranging method such as "quick sort". As mentioned above, when all of the media are substituted at once, the storing locations of all of the media are inspected. If the storing locations are wrong, they can be corrected. Thus, the media can be stored in the proper locations.

Since the degeneration operation is executed during the storing means substituting process, at least one of the recording and reproducing means is not used for the reading/writing process. Thus, the recording and reproducing apparatus can be used for the inspecting work of the storing location of the inserted medium and the "on-line process" in which the redundancy library apparatus processes read/write requests from the host computer and the substitution of the failure storing means, and process for substituting, confirming, and storing the media can be executed in parallel.

According to the invention, when a fault occurs in an arbitrary one of storing means constructing the redundant library apparatus, a number of media stored in the failed storing means are re-stored into new storing means and the storage locations of the media can be confirmed. If the media are erroneously stored, the locations can be corrected. Consequently, there is an effect such that the loss of data due to occurrence of mismatch of the media group due to erroneous storage can be prevented.

According to the invention, since the confirmation and correction of storage locations at the time of the media substitution as the first effect can be performed during an on-line operation of the redundant library apparatus, there is an effect such that the on-line service for performing the reading/writing processes and the process for recovering the failure storing means can be executed in parallel.

Further, according to the invention, while realizing the first and second effects, the media inserting time by a human can be minimized in the process for re-storing the media into the new storing means, so that there is an effect of labor saving.

Further, according to the invention, by detecting first the media of the media group being presently used in the inspection of the media, the media group being presently used can be immediately recovered, the degeneration operation is recovered to the normal operation, and the confirmation and correction of the storage locations of other media can be performed later. Consequently, there is an effect that the degeneration operation time in which performance deteriorates can be shortened.

BRIEF DESCRIPTION OF THE DRAWINGS

FIG. 11 is a diagram showing the configuration of a media storing management table of the second embodiment of the invention.

DETAILED DESCRIPTION OF THE PREFERRED EMBODIMENTS

Figure 4:
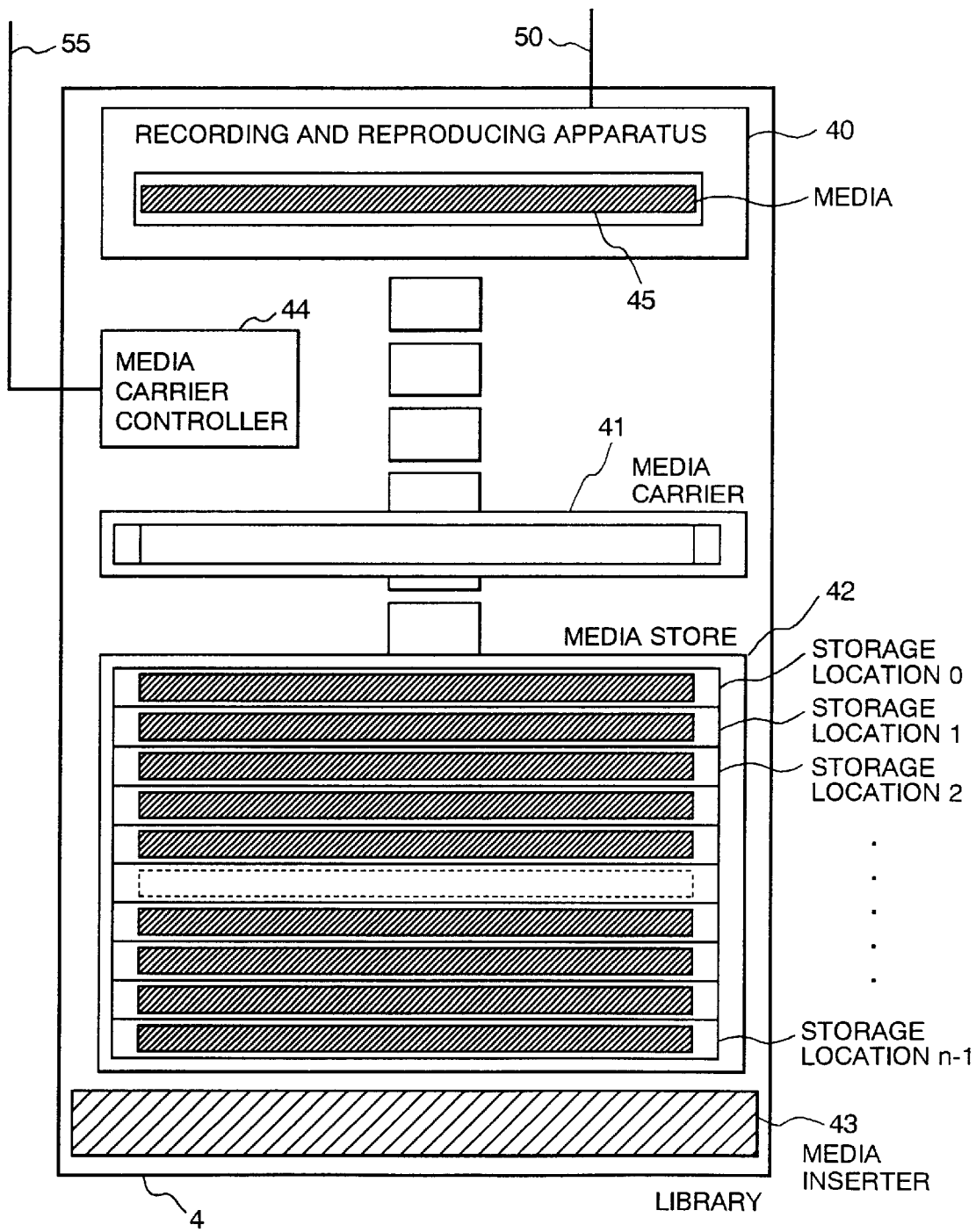
FIG. 4 is a diagram showing the configuration of a library according to an embodiment of the invention.

Embodiments of the invention will be described. In order to clarify the description, the construction of the RAIL according to the conventional technique is presumed as that of redundant libraries of the embodiment. That is, in the RAIL, a plurality of independent libraries are arranged in an array. Each of the libraries has a recording and reproducing apparatus, a media carrier, a media store, and a media inserter as shown in FIG. 4. The invention can be applied not only to such RAIL but also general redundant libraries in which each of the recording and reproducing apparatus, the media carrier, the media store, and the media inserter has redundancy.

First embodiment (method of inserting media from a insertion slot one by one)

(1) Configuration of RAIL

Figure 3:
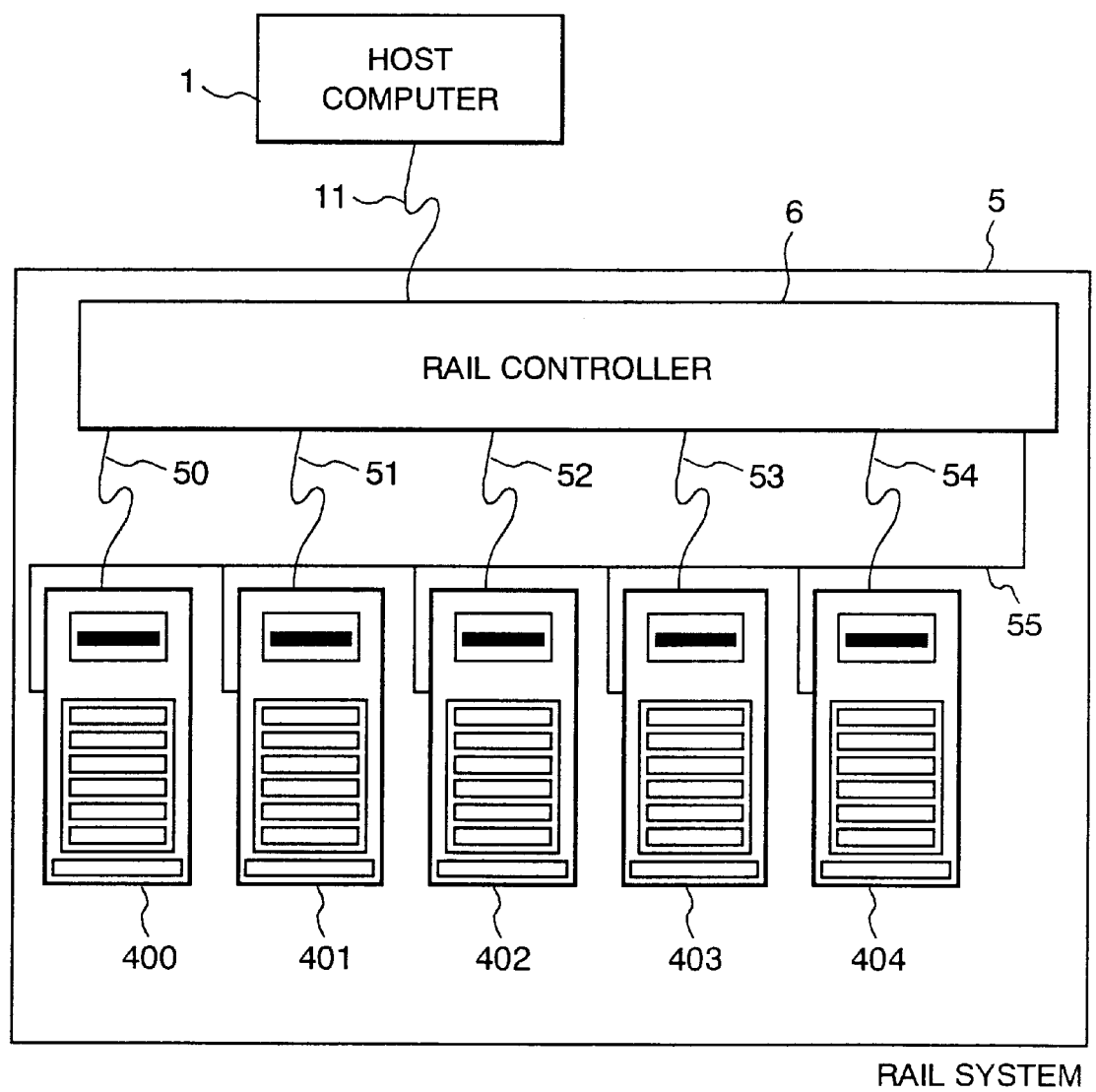
FIG. 3 is a diagram showing the configuration of RAIL of the invention.

A first embodiment will be described. FIG. 3 is a diagram showing the system configuration of the invention.

A host computer 1 and RAIL 5 are connected by a host interface (hereinbelow, simply described as "I/F") 11.

In the RAIL 5, reference numeral 6 denotes an RAIL controller and 400 to 404 indicate libraries. Recording and reproducing apparatuses (which will be described hereinlater) in the libraries are connected to the RAIL controller 6 via recording and reproducing I/F's 50 to 54. Media carrier controllers (which will be described hereinlater) in the libraries 400 to 404 are connected to the RAIL controller 6 via a carrier controller I/F 55.

(2) Configuration of library

FIG. 4 is a diagram showing the configuration of a library. Reference numeral 40 denotes a recording and reproducing apparatus for loading removable media and for reading and writing data from/to the media; 41 a media carrier for carrying and storing the removable media from a media inserter 43 to a media store 42 and for loading the media from the media store 42 to the recording and reproducing apparatus 40; 42 the media store for storing a plurality of removable media; 43 the media inserter for storing the removable medium from the outside to the library 4; 44 a media carrier controller for operating the media carrier 41 by an instruction from an upper system to move media or operate the media inserter; and 45 a removable medium (hereinlater, simply called a medium) such as DVD, CD-ROM, CD-R, MO (magnetooptic disk), or the like. The media store 42 has (n) storage locations (n is an integer which satisfies n>0). Logical location numbers 0 to (n−1) by which the location can be unconditionally specified are allocated to the locations. When the medium is carried to a specific storage location by the media carrier 41, the logical number of the storage location is used. Hereinbelow, the number is called a "storage location number".

As mentioned above, the recording and reproducing apparatus 40 is connected to the RAIL controller 6 via the recording and reproducing I/F 50 (or 51 to 54). The media carrier controller 44 is connected to the RAIL controller 6 via the media carrier control I/F 55.

Although an example where the recording and reproducing apparatus 40 is provided in the library 4 as shown in FIG. 4 is described in the embodiment, the recording and reproducing apparatus 40 may also have the construction which is separated from other means. Although the following description will be given on the basis of FIG. 4, the invention can be also similarly applied to the library having a separated construction.

Figure 8:
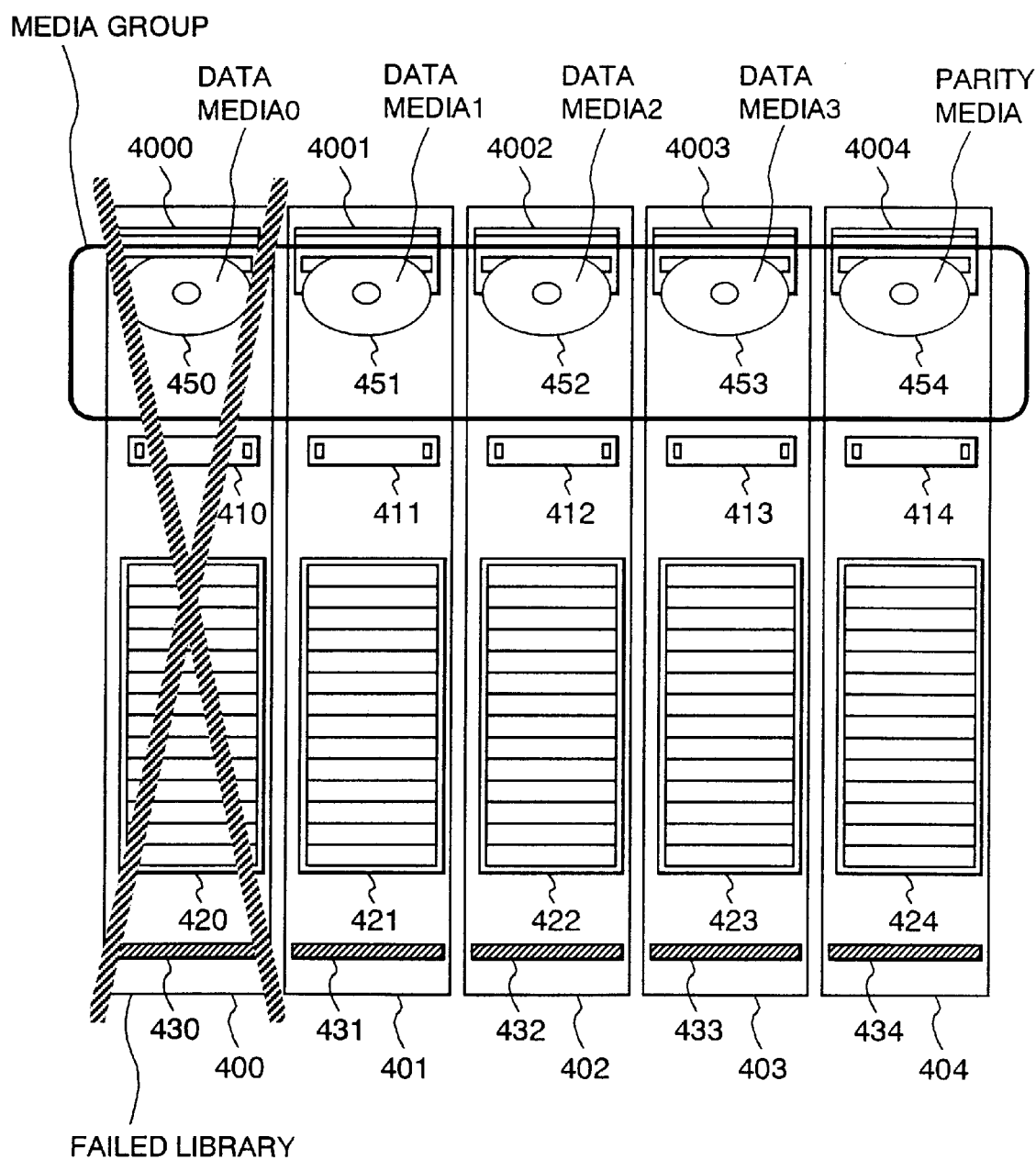
FIG. 8 is a diagram showing the configuration of a media group according to an embodiment of the invention.

In the description of the RAIL, when component elements of each of the plurality of libraries 400 to 404 are shown, reference numerals shown in FIG. 8 are used.

(3) Configuration of RAIL controller

Figure 5:
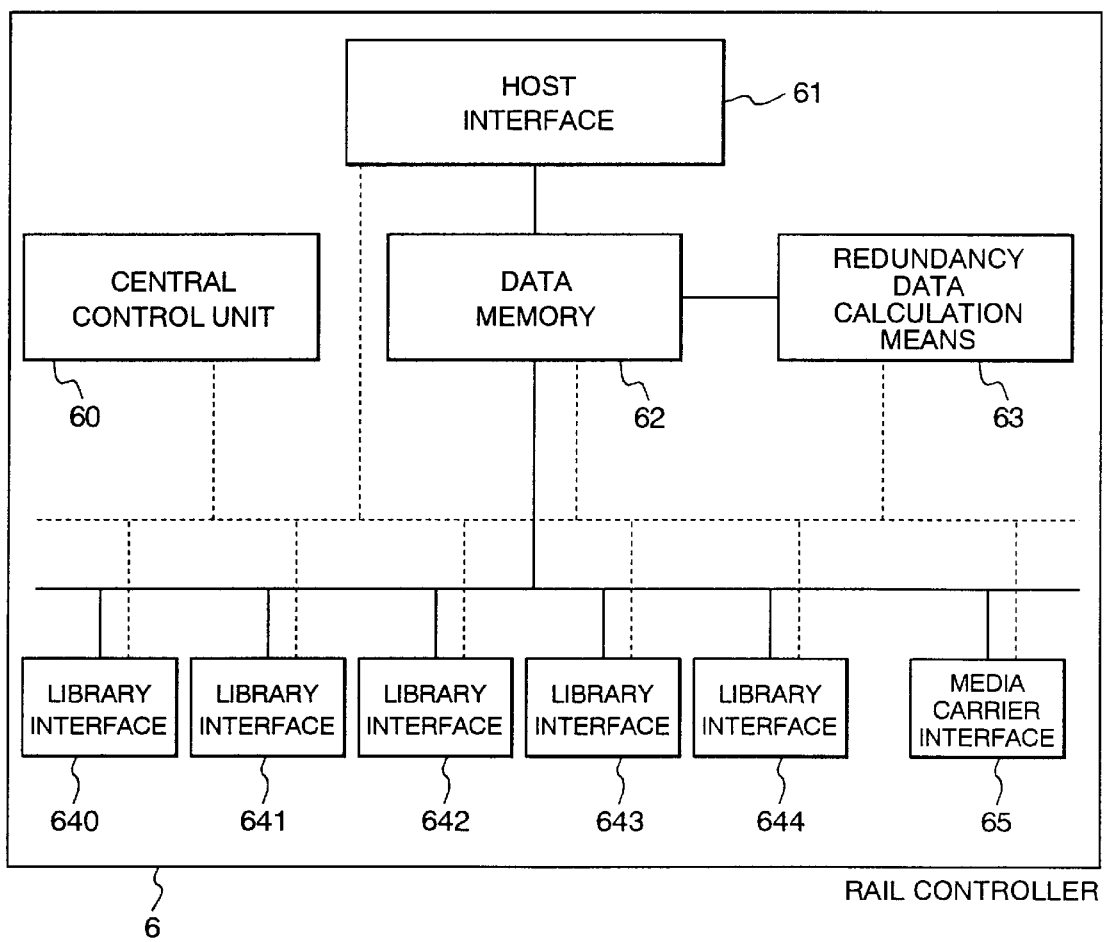
FIG. 5 is a diagram showing the configuration of an RAIL controller according to an embodiment of the invention.

FIG. 5 is a diagram showing the configuration of the RAIL controller 6. Reference numeral 61 denotes a host interface for receiving commands from the host computer and transferring data via the host I/F 11; 640 to 644 library interfaces for transmitting commands and transferring data to the recording and reproducing apparatuses 40 of the libraries 400 to 404 via the recording and reproducing I/F's 50 to 54; 62 a data memory constructed as a disk cache for absorbing a difference in data transfer speed between the recording and reproducing apparatus 40 in each library and the host computer 1, temporarily storing data recently used, and transferring the data without operating the libraries 400 to 404 when an access to the data is again requested by the host computer 1; 63 a redundant data calculator for generating redundant data (parity) to be stored in a parity medium and reproducing data stored in a medium stored in the library in which a fault occurred or data stored in a library or a medium in which a fault occurred; 65 a media carrier interface for issuing a command to the media carrier controller 44 via the media carrier control I/F 55 in order to control the media carrier 41 in the library 4; and 60 a central control unit for controlling the means constructing the RAIL controller 6.

Although the library interfaces and the libraries are connected in a one-to-one corresponding manner in the embodiment, (n) (an integer which satisfies n>0) libraries can be also connected to one library interface. Although five libraries are connected to the media carrier interface, the number of libraries to be connected can be also set arbitrary.

Further, the library interface and the media carrier interface are separately provided, they can be formed in one interface. As a preferable interface having both of them, an SCSI (Small Computer Systems Interface) is often used. The following description will be given on the basis of FIG. 5. The invention can be also similarly applied to a case where the construction of the interface is different.

(4) Configuration of central control unit

Figure 6:
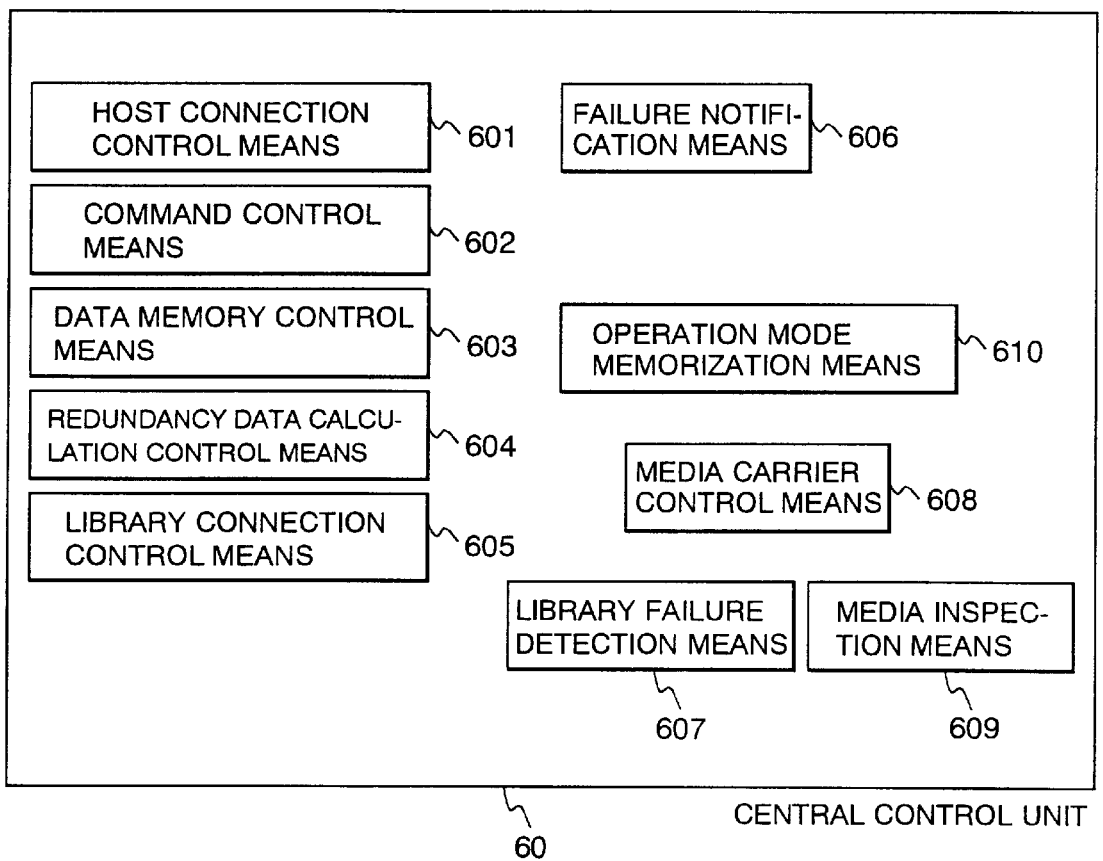
FIG. 6 is a diagram showing the configuration of a central control unit according to an embodiment of the invention.

As a preferable embodiment, the central control unit 60 can be realized by using a microprocessor unit (MPU), an executing program of the MPU, and a memory for storing programs and data. FIG. 6 is a diagram showing the configuration of the central control unit 60. Reference numeral 601 denotes a host connection control means for controlling the host interface 61; 602 a command control means for analyzing a command received from the host computer 1 and converting the command into a command to the recording and reproducing apparatus 40 of each of the libraries 400 to 404; 603 a data memory control means for determining an area to store data which is read or written in response to the command in the data memory 62 and for discriminating hit/mistake of a disk cache; 604 a redundancy data calculation control means for controlling the redundancy data calculator 63 when redundant data (parity) is generated at the time of writing operation or when data stored in a failed medium or data in a medium stored in a failed library is reproduced; and 605 a library connection control unit for controlling the library interfaces 640 to 644.

Reference numeral 608 is a media carrier control means for controlling the media carrier interface 65 in order to issue a command to operate the media carrier 41 of each of the libraries 400 to 404; 607 a library failure detecting means for detecting occurrence of a failure in each of the libraries 400 to 404; 609 a media inspection means for inspecting media so that a correct medium is stored in a correct storage location; 610 a configuration information holding means for holding various management information of the RAIL 5 used by the central control unit 60 such as configuration information of the RAIL 5, media management information, media group management information, fault information of a library, and the like; and 606 a failure notification means for notifying the user of failure information in a case such that a fault occurs in a library or a medium and receiving a command of failure recovery from the user.

(5) Configuration of medium

Figure 7:
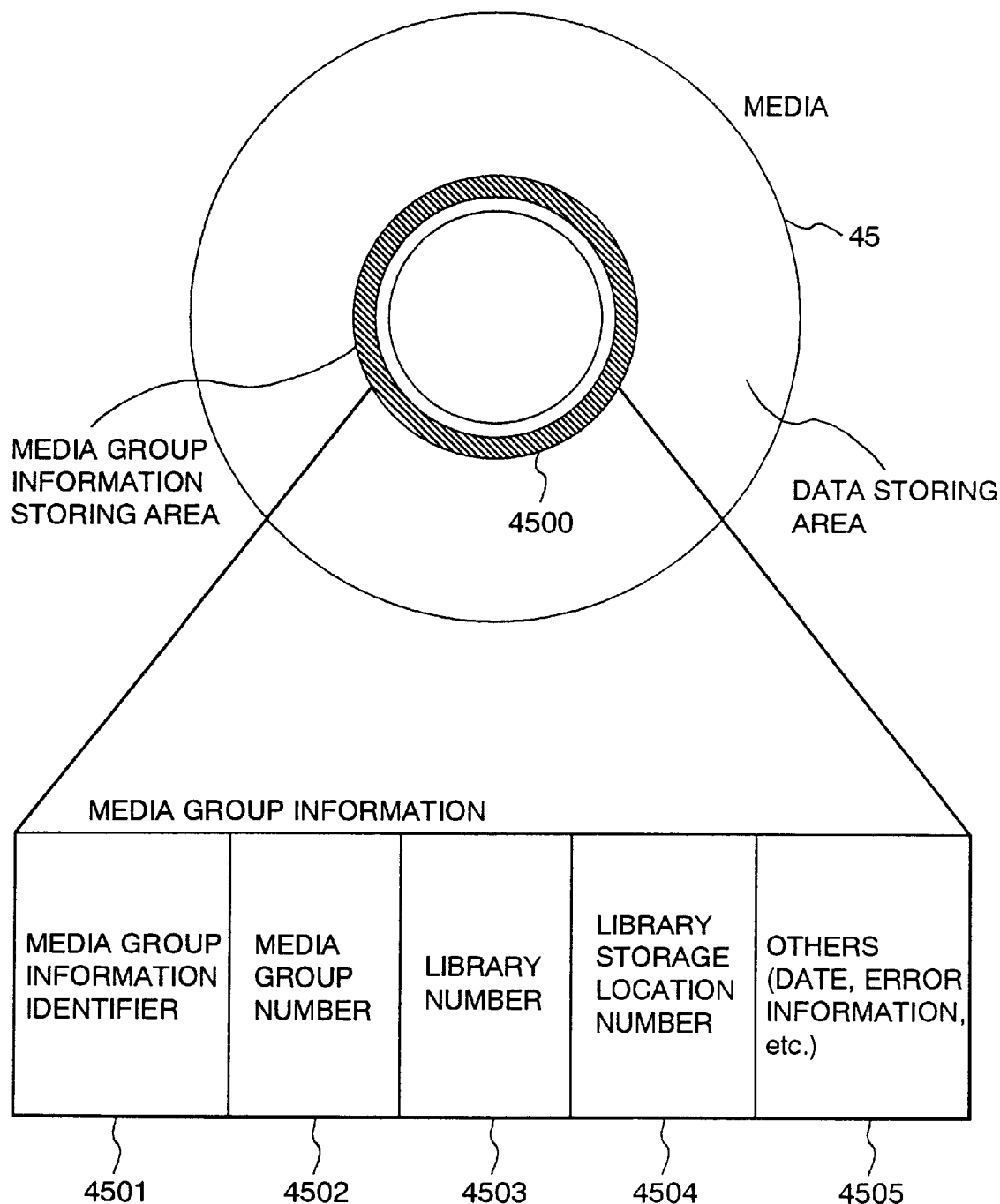
FIG. 7 is a diagram showing the configuration of a medium and media group information of an embodiment of the invention.

FIG. 7 shows the configuration of the medium 45 used in the RAIL of the invention. Reference numeral 4500 denotes a media group information storing area as a specific area into which the RAIL controller 6 stores information. The area 4500 is allocated in a specific logical address (for example, logical address 0) on the medium and has to be concealed from the host computer 1.

Data contents stored in the medium 45 are a media group information identifier 4501, a media group identification number 4502, a number 4503 of the library 4 for storing the medium, a storage location number 4504 of the media store 42 in the library 4, and data 4505 for managing information such as date and time of initialization of the medium and error information.

(6) Configuration of media group

FIG. 8 shows the configuration of the media group. Media 450 to 454 are stored in recording and reproducing apparatuses 4000 to 4004. An ECC group constructed by a plurality of media used for dispersing data and a medium for storing the parity is called a "media group". In case of the RAID4 configuration, the media 450 to 453 for storing data are called data media 0 to 4 and the medium 454 for storing the parity is called a parity medium.

In a manner similar to the media stored in the recording and reproducing apparatuses 4000 to 4004, media stored in media stores of libraries 400 to 404 construct a media group among the different libraries 400 to 404. The media groups are allocated with a series of identification numbers. The information of the identification number is stored in the media group information storing area 4500 of each medium. The media group number has to be an absolute number so as not to be mixedly used with a medium used in another RAIL or other media groups once used in the RAIL. In order to assure the uniqueness, it is desirable to generate the number from a serial number of the RAIL or by combining data such as date and time of formation of the media group.

In the embodiment, it is assumed that the plurality of media constructing the media group are stored in the same storage location number of each of the different libraries. That is, the media of the same media group are stored in a lateral line. There is accordingly an effect that average time for substituting the media group by operating the media carrier (average media group substitution time) when the media group to be mounted is substituted is minimized. If the media of the group are stored in arbitrary positions, the media group substitution time is determined by a longest time taken for carrying one of the media. Consequently, the average media group substitution time becomes longer. According to the above storing method, there is also an effect that the management of the media by the RAIL controller is facilitated. It is obviously understood that the media may be stored in arbitrary storage locations and the RAIL controller 6 manages the relations among the media and corresponds the media.

(7) Initialization of medium (registration of media group information)

The operation of the embodiment will be described. First, operation for storing new media into libraries will be described. The user inserts new media into inserters 430 to 434 in the libraries 400 to 405. The user controls the host computer 1 to issue a command instructing initialization of the media. The host interface 61 of the RAIL controller 6 receives the command and notifies the central control unit 60 of the command. The host connection control means 601 in the central control unit 60 receives the command and the command control means 602 analyzes the command. The process is then passed to the media carrier control means 608. The means 608 issues commands to the media carrier control units 440 to 444 of the libraries 400 to 404 so that the media are carried from the media inserters 430 to 434 to the recording and reproducing apparatuses 4000 to 4004. The libraries 400 to 404 receive the commands and set the media to the recording and reproducing apparatuses 4000 to 4004.

Subsequently, the media inspection means 609 in the central control unit 60 issues commands to the recording and reproducing apparatuses 4000 to 4004 via the library connection control means 605 so as to read media group information from addresses in the media in which the media group information storing area should be. The read data is transferred from the recording and reproducing apparatuses 4000 to 4004 to designated areas in the data memory 62 via the recording and reproducing I/Fs 50 to 54 and the library I/Fs 640 to 644. The media inspection means 609 inspects the read data. Since the media are new, the read data is not included in the media group identification information 4501. The media inspection means 609 recognizes that the media are new media and determines storage locations of the media in the media stores 420 to 424 in the libraries 400 to 404 by referring to the configuration information holding means 610. Any storage locations can be used as long as they are empty. The means 609 builds a media group by the media, generates the media group identification number 4502 by a method as mentioned above, and stores the media group identification number 4502 together with the determined storage locations into the configuration information holding means 610. The means 609 issues a command to write the media group information identifier 4501, the media group number 4502, the library number 4503, the library storage location number 4504, and the other information 4505 via the library connection control means 605 and stores the media group information to the respective media. Subsequently, by writing "0" to the data memories in all of the media, matching of the data and the parity of the media group is obtained. The initialization of the media is completed and the end of the initialization instruction command is notified to the host computer 1.

After that, the host computer 1 can use the media group as a logical volume and executes logical formatting of the logical volume. When the logical formatting is finished, the media group can be used from the host computer 1.

In the following description, the central control unit 60 controls the media carrier 41 in the library 4 to move the media among the recording and reproducing apparatus 40, the media store 42, and the media inserter 43. The method is similar to the above-mentioned method. It will be therefore described as "execute the carrying control" and the description of the carrying control is omitted unless it is especially mentioned.

In the following description, the central control unit 60 issues a command of reading/writing data to from/to the media to the recording and reproducing apparatus 40 in the library 4. The method is also similar to the above-mentioned method. It will be described as "execute the reading/writing control" and the description of the recording/reproducing control is omitted unless it is especially mentioned.

(8) Initialization of configuration information holding means

When the power source is turned on in the RAIL, since nothing is recorded in the configuration information holding unit 610 in the central control unit 60, it is necessary to initialize the unit 610. Further, it is necessary to confirm that the media keep the relation of the media group and are stored in the correct storage locations. Even if the media group constructed by the libraries keeps the correct positional relation before the operation, when the power source is once turned off and is again turned on, it is not assured that the storage locations of the media are kept as they are. Since the media of the RAIL are portable, they may be moved by a human while the power is off.

The media inspection means 609 controls the media carrier control unit 608 to execute the carrying control and further controls the library connection control means 605 to perform the reading/writing controls. All of the media stored in the media stores 420 to 424 in the libraries 400 to 404 are sequentially mounted and the media group information is read and is stored into the configuration information holding means 610. "Mounting" here denotes operation for taking out the media in the designated media group from the media stores in the libraries and setting the media into the recording and reproducing apparatuses. When information is stored into the configuration information holding means 610, it is confirmed that the media stored in the same storage location in the different libraries are the media which belong to the same media group and the information is then stored while the media are related to each other.

(9) Mounting of media

The media mounting operation will be described. It is assumed that a mounting media request is issued from the host computer 1 and is directly designated by the media group number as the host computer 1 manages the media group as a logical volume.

The host interface 61 in the RAIL controller 6 receives the mounting request command from the host computer 1 and notifies the center control unit 60. The center control unit 60 acquires the command, analyzes it, and recognizes that the command is a request of mounting the media group. The central control unit 60 executes the carrying control to thereby store the media presently mounted in the recording and reproducing apparatuses 4000 to 4004 in the libraries 400 to 404 to proper storage locations in the media stores 420 to 424. Subsequently, the central control unit 60 executes the carrying control to thereby take out the media of the media group which are the targets of the mounting request and transfer and mount them to the recording and reproducing apparatuses. In this case, the storage location can be obtained by referring to the configuration information holding means 610.

If the address space of the RAIL is seem to be flat, that is, in one logical volume from the host computer, there is a case that the mounting request is not issued. In this case, it may be necessary that the correspondence relation between the address space seen from the host computer and the media group is stored in the configuration information holding means 610, the address accessed by the command control unit 602 is recognized, and a different media group is mounted in accordance with necessity. In this case, although the mounting request is generated in the RAIL controller 6, the operation except for that is similar to the above.

(10) Read/write command process

Figure 1:
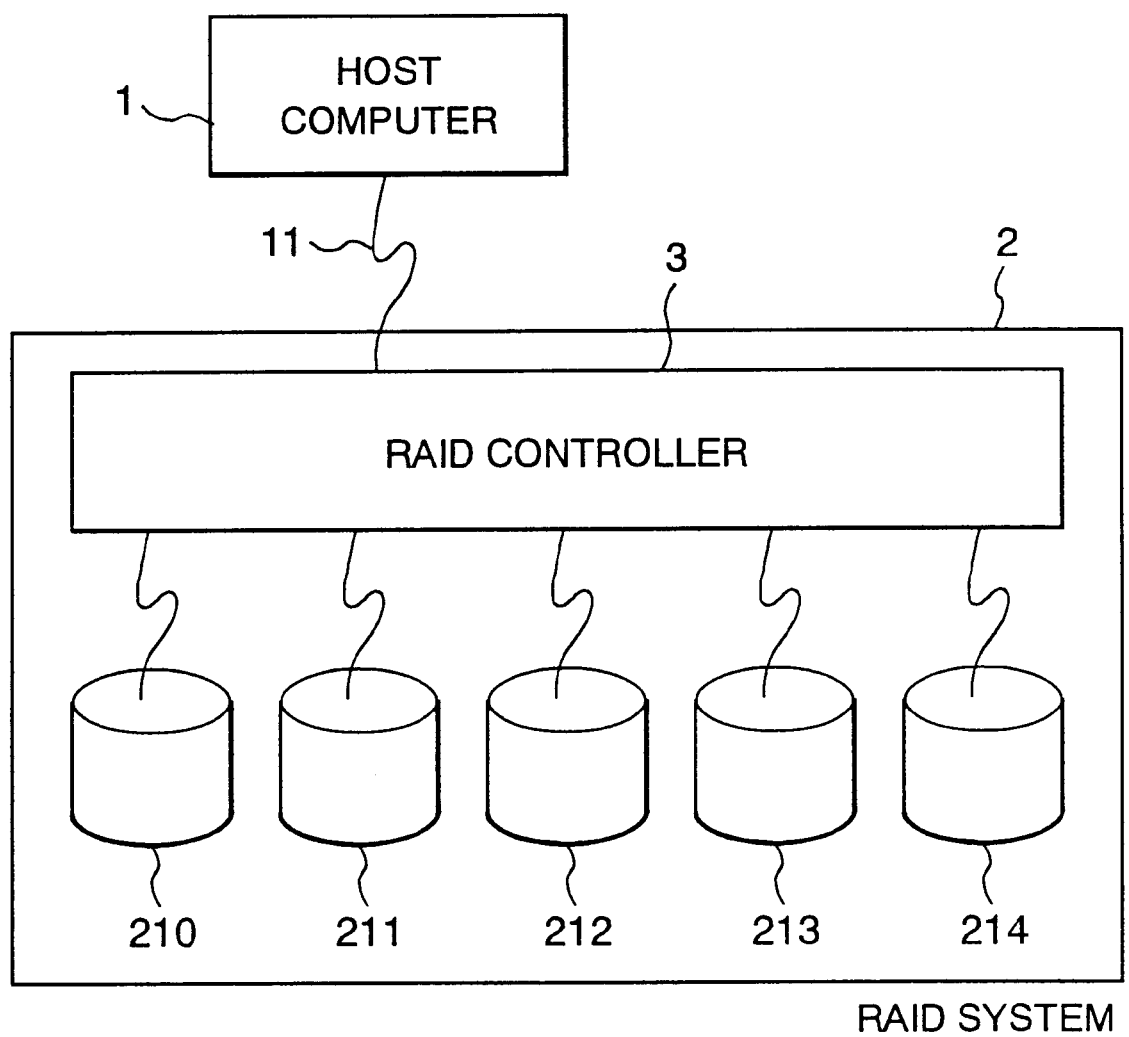
FIG. 1 is a diagram showing the configuration of an RAID according to a conventional technique.
Figure 2:
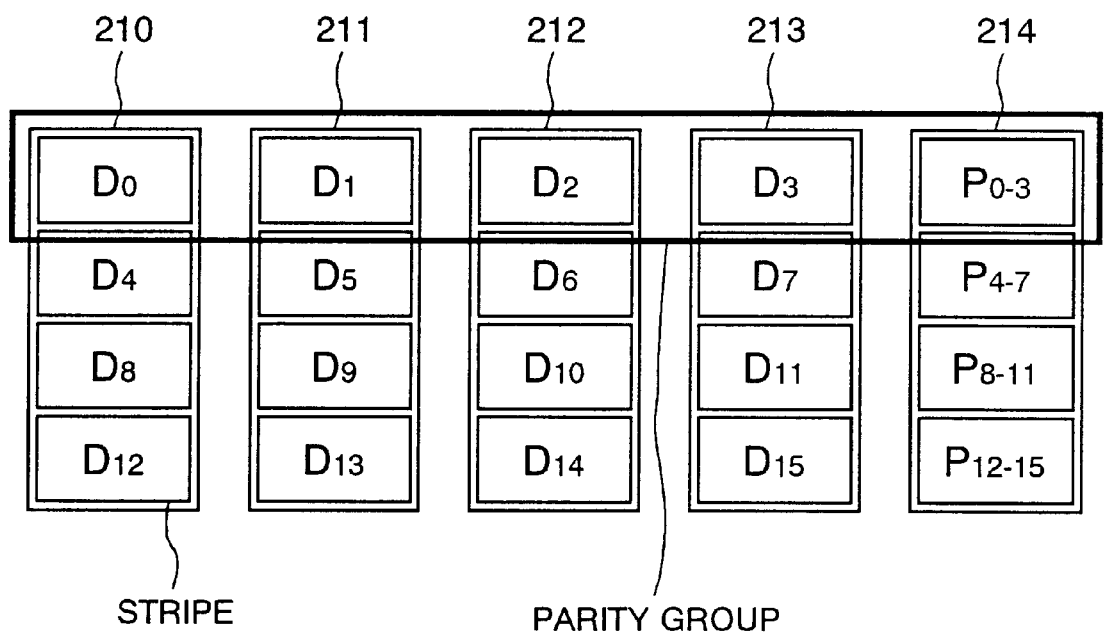
FIG. 2 is a diagram showing the configuration of data striping in RAID and RAIL.

Operation when a read/write request is issued from the host computer to the mounted media group will be described. When the read command is issued from the host computer 1, the command control means 602 in the central control unit 60 analyzes the command. Since the data is dispersed as shown in FIG. 2, the command control means 602 calculates which medium stores the data that is requested by the host computer to be read. The calculation is called address conversion. As a result of the address conversion, when it is assumed that D2 in FIG. 2 is access data, the data is stored in the data medium 2. The command control means 602 generates a read command to the recording and reproducing apparatus 4002 in the library 402. The data memory control means 603 assures an area in the data memory 62, into which the read data is stored. The library connection control means 605 issues the read command to the library interface 642 and the library interface 642 transfers the data from the recording and reproducing apparatus 402 to the data memory. When the transfer is finished, the library interface 642 notifies the end to the central control unit 60. The host connection control unit 601 in the central control unit 60 issues a data transfer command to the host interface 61. The host interface 61 transfers the data stored in the data memory 62 to the host computer 1. When the transfer is finished, the host interface 61 notifies the end to the central control unit 60. The host connection control means 601 in the central control unit 60 controls the host interface 61 to report the end to the host computer, and the read command process is finished.

When a write command is issued from the host computer, there are two points different from the case of the read command that the transfer direction is different and the parity is calculated. When it is assumed that D2 in FIG. 2 is write data in a manner similar to the read operation, it is necessary to update a corresponding parity P1. There are the following two methods (equations c and d) to update the parity.

$$\text{New } P0 = D0 + D1 + \text{new } D2 + D3 \qquad \text{(Equation c)}$$

where, + denotes exclusive OR operation.

$$\text{New } P0 = \text{old } D2 + \text{new } D2 + \text{old } P0 \qquad \text{(Equation d)}$$

According to the method of (equation c), prior to generation of the parity, it is necessary to read and store the data D0, D1, and D3 to the data memory 62. According to the method of (equation d), prior to generation of the parity, it is also necessary to read old D2 and old P0. The reading operation of the data is similar to the operation of the read command. If the data D0, D1, and D3 are already stored in the data memory 62 (or the old D2 and the old P0 are stored), the reading operation is unnecessary.

Either the method (equation c) or (equation d), when all of data is prepared in the data memory 62, the redundancy data calculation control means 604 activates the redundancy data calculator 63 to execute the calculation of (equation c) or (equation d), and the end of the calculation is notified to the central control unit 60. The command control unit 602 in the central control unit 60 generates a D2 write command and a new P0 write command and issues both of the commands to the recording and reproducing apparatuses 4002 and 4004. The library interfaces 642 and 644 transfer both of the data from the data memory 62 to the recording and reproducing apparatuses 4002 and 4004 and store them into the data medium 451 and the parity medium 454. When the transfer is finished, the central control unit 60 issues an end report to the host computer 1 in a manner similar to the case of the read command, thereby finishing the write command process.

(11) Detection of failure of library

Figure 9:
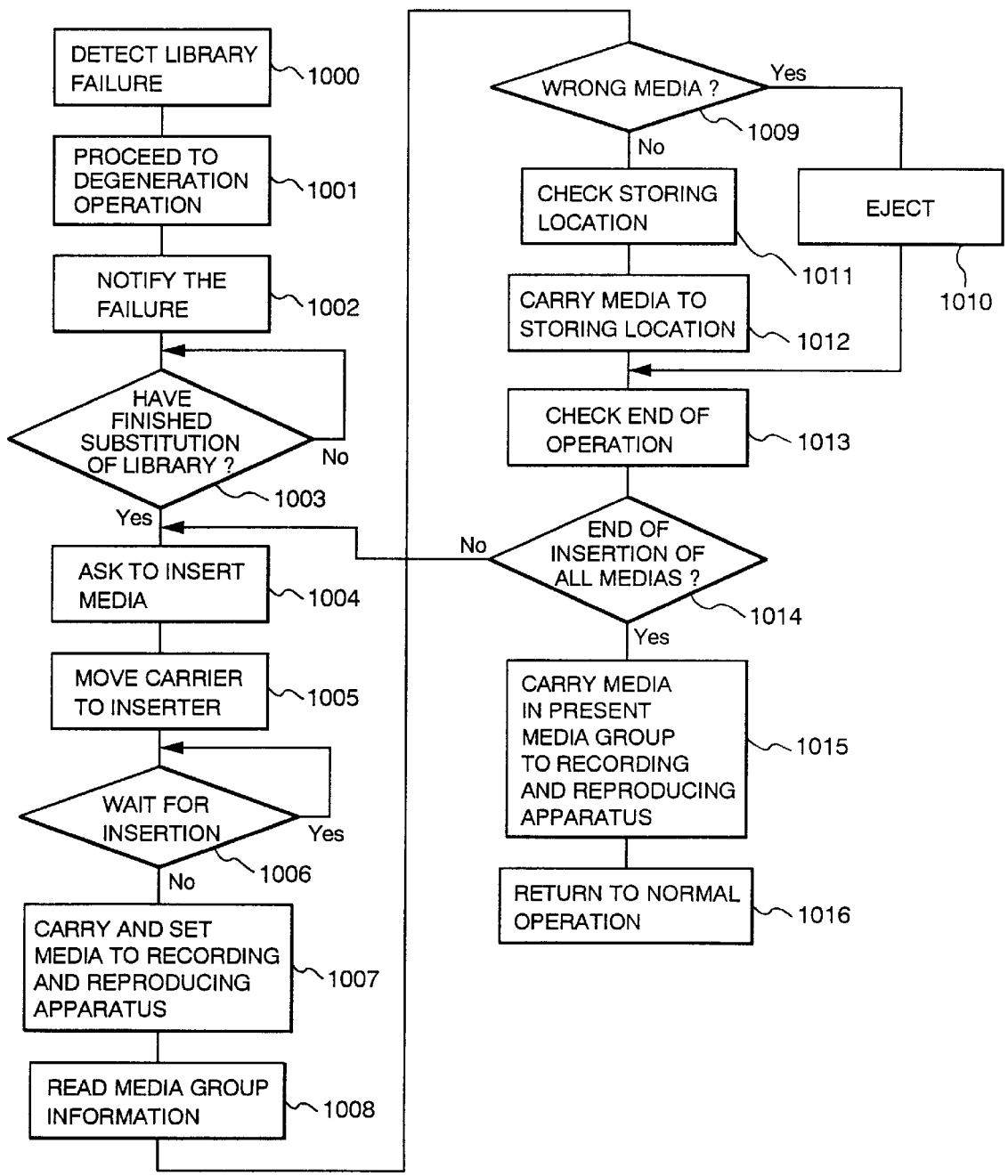
FIG. 9 is a flowchart of a first embodiment of the invention.

A case where a fault occurs in the library 400 as an element of the RAIL 5 as shown in FIG. 8 will be described by using the flowchart of FIG. 9. First, the fault in the library will be described. Broadly two kinds of failure detection can be considered. The first relates to a case where the library itself detects a fault. The library itself detects that the recording and reproducing apparatus 40 cannot read and write or the media carrier 41 is inoperative and reports error information to the RAIL controller 6. The second relates to a case where the library is inoperative and the central control unit 60 detects it. In either case, when the library failure detection means 607 in the central control unit 60 recognizes the matter, the library is detected as a failed library (step 1000 in FIG. 9).

(12) Degeneration operation

The library failure detection means 607 shifts the RAIL controller 6 to degeneration operation (1001). The degeneration operation denotes here that when a failure occurs in one of the libraries, data in all of the media stored in the library is read and written by using data and parities of the media in the other libraries. For example, when it is requested to read the data D0 to be stored in the data medium 0 (450) in the library 400, the data D0 is reproduced from the data D1, D2, and D3 stored in the data media 1 to 3 (451 to 453) in the other normal libraries 401 to 404 and the parity P0 stored in the parity medium 454 by the (equation b) of the conventional technique. When it is requested to write the data D0, D0 to be written and P0 are generated from the data D1, D2, and D3 and only P0 is updated. The library failure detection means 607 records the shift to the degeneration operation in the configuration information holding unit 610. After that, the command control means 602 performs the above-mentioned address conversion for the degeneration operation. The fact that all of the media in the library 4000 cannot be used is also recorded in the configuration information holding means 610.

(13) Failure notification and library substitution

The library failure detection means 607 controls the failure notification unit 606 to notify the host computer 1 via the host interface 61 of occurrence of the failure in the library 400. In this instance, a message or an indicator suggesting substitution by a new library 400' is displayed to notify the user of the fault (1002). When the user substituted the library, the host computer 1 notifies the completion of substitution to the RAIL controller 6 and the failure notification unit 606 notifies it to the library failure detection means 607 (1003).

(14) Insertion of medium

The means 607 passes over the process to the media inspection means 609. The means 609 controls the failure notification means 606 to make the host computer 1 take out one medium from the failed library 400 and insert the medium into a medium inserter 430' of the new library 400' (1004). The media inspection means 609 executes the carrying control to move a medium carrier 410' to the medium inserter 430' and waits (1005).

(15) Inspection and storage of medium

Insertion of a medium by the user is waited (1006). When the medium is inserted, the media inspection means 609 executes the carrying control to move and mount the inserted medium to a recording and reproducing apparatus 4000' (1007). The means 609 executes reading operation to read the media group information stored in the medium and store the read information into the data memory 62 (1008). The media inspection unit 609 inspects the library number 4503 of the information and confirms that the medium was in the library 400 (1009). If the medium is a medium in a different library, the carrying control is performed to eject the medium (1010). If the medium is the medium in the correct library, the library storage location number 4004 is checked (1011) and the carrying operation is performed so as to store the medium into the location (1012). The media inspection unit 609 notifies the host computer 1 of completion of the storage of one medium and issues a notification asking an instruction of insertion of a next medium or an instruction of end of the inserting process (1013). If the next medium is inserted, the processing routine is returned to the medium insertion (1004) and the process is repeated until all of the media are stored.

(16) Recovery from degeneration operation to normal operation

When a notification of completion of storage of all of the media is received from the host computer 1 (1014), the media inspection means 609 returns the process to the library failure detection means 607. The library failure detection means 607 checks the media group which is presently being mounted by referring to the configuration information holding means 610 and mounts the media in the same media group into the new library 4000'. Further, the means 607 returns the operation from the degeneration operation to the normal operation and records it in the configuration information holding means 610. The means 607 records the media stored in the all of the libraries as usable media into the configuration information holding means 610. Subsequently, the return to the normal operation is notified to the host computer 1 and the recovering from the library fault state is finished (1016).

(17) Effects

As mentioned above, in the RAIL, when a failure occurs in a library and the library is substituted by a new library, all of the media stored in the failed library have to be again stored in the new library. According to the embodiment, the media can be stored in the correct storage locations without mistake and the state can be recovered to the state before occurrence of the failure. Consequently, there is an effect that the data can be prevented from being lost due to loss of matching of the media group by erroneous storage.

Since the media in the same media group can be stored in the same storage location number of the libraries, they are effects such that the average substitution time can be minimized when the media group is substituted and high-speed carrying performance can be realized.

Further, when one of the libraries is failed and the RAIL provides service by the degeneration operation, the media in the failed library can be stored in the correct locations in a new library in the background. Consequently, there is an effect that the RAIL having high availability can be realized.

Second embodiment (method in which media are continuously inserted in a proper order, and later, the apparatus checks and sorts the media)

A second embodiment of the invention will be described. In the first embodiment, the operator inserts the media one by one and the RAIL controller stores the media to the correct locations each time. Although the media can be certainly stored in the correct locations, the operator has to be present for the work for a long time. When the number of media to be stored in the libraries reaches hundreds, the time required is very long. In the second embodiment, a method of solving the problem is provided.

With respect to the construction of the second embodiment, in addition to the construction of the first embodiment, a media storing management tale 6101 shown in FIG. 11 is provided in the configuration information holding unit 610. It is necessary to prepare the media storing management table 6101 in accordance with the storage location of each library. When the power source is turned on, all of the locations are set to "empty". When it is found from the media check that the medium is correctly stored, "final storing" is recorded. When the library is failed, all of locations in a table for the library are set to "vacant".

Only points of operation different from that of the first embodiment will be described hereinbelow.

(1) Substitution of failed library

Figure 10:
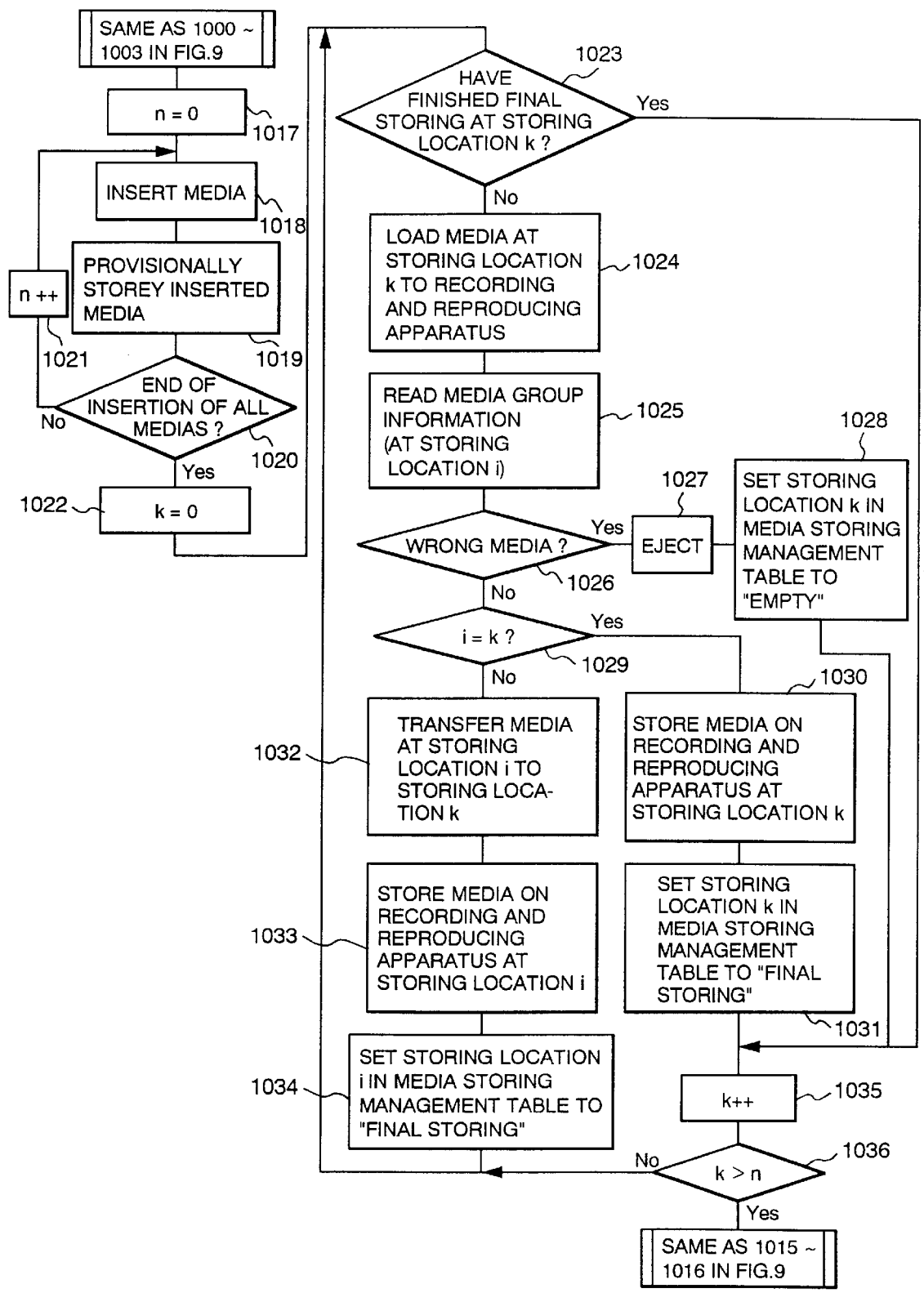
FIG. 10 is a flowchart of a second embodiment of the invention.

FIG. 10 is a flowchart showing the operation when a fault occurs in a library in the second embodiment. A description will be given hereinbelow with reference to the diagram.

When occurrence of a failure in the library 400 is detected by the central control unit 60 (step 1000), the operation is shifted to degeneration operation (1001), the failure is notified to the user (1002), and the user connects the new library 400', thereby finishing the substitution (1003).

(2) Substitution of media (sequential insertion)

The media inspection means 609 in the central control unit 60 initializes a counter (n) to 0 (1017). The media inspection unit 609 instructs the host computer 1 via the failure notification means 606 to insert a new medium and the operator inserts a medium (1018). The media inspection means 609 performs the carrying control, to provisionally store the inserted medium into a storage location (n), and "provisional storing" is set at the location (n) in the media storing management table 6101 (1019). The means 609 requests a check to see whether all of the media have been inserted or not via the failure notification unit 606 (1020). If there are more media to store, the counter (n) is increased (1021) and the provisional storage of all of the media is repeated. When the process is finished, the number (n) of stored media is determined.

(3) Inspection of media storing management table

Subsequently, the media inspection means 609 initializes another counter (k) to 0 (1022). The media inspection means 609 checks whether a correct medium has been moved and stored in a storage location (k) or not by referring to the media storing management table in the configuration information holding unit 610 shown in FIG. 11 (1023). In case of k=0, even one medium has not been checked and "provisional storing" is set in the media storing management table 6101, so that the discrimination is false. When k=j ($n \geq j \geq 1$), there is a case that movement which will be described hereinlater is performed in k which satisfies k<j and "final storing" is set. In this case, the processing routine advances to step 1035 and k is increased (1035) and k<n is checked. If k<n, the processing routine is returned to step 1023 and the process of (3) is repeated (1036).

(4) Movement of media

When false is determined in the check of the media storing management table whether the medium is the moved medium or not, the medium provisionally stored in the storage location (k) is carried and is loaded in the recording and reproducing apparatus 4000' (1024). Subsequently, the media inspection unit 609 in the central control unit 60 reads media group information and checks if the library storage location number 4504 is (i) (an integer which satisfies $i \geq 0$) (1025).

If the medium is erroneously inserted, for example, if the medium is one which should not be stored in the library 400' or a new medium, the medium is carried and ejected (1027) and "vacant" is set at the location (k) in the media storing management table (1028).

If k=i (1029), the location is correct, so that the medium is stored at the storage location (j) by the carrying control (1030) and "final storing" is set at the location k (=i) in the media storing management table 6101 (1031). The processing routine advances to step 1035 and (k) is increased (1035). k<n is checked and if k<n, the processing routine is returned to step 1023 and the processes of (3) and (4) are repeated (1036).

If k≠i (1029), the carrying control is performed. The medium presently stored at the storage location (i) is once moved to the storage location (k) and the location (k) in the media storing management table is set to "provisional storing" (1032). The medium loaded in the recording and reproducing apparatus 4000', which should be stored at the storage location (j), is stored into the correct storage location (i) by the carrying control (1032) and "final storing" is set at the location (i) in the media storing management table (1034). The processing routine is returned to step 1023 without increasing (k) and the processes of (3) and (4) are repeated until the correct medium is stored at the storage location (k).

(5) Return from degeneration operation to normal operation

When the above processes are executed with respect to all of k<n, all of the media can be stored at the correct storage locations. After that, in a manner similar to the first embodiment, the media inspection means 609 returns the process to the library failure detection means 607. The library failure detection unit 607 confirms the media group presently being mounted with reference to the configuration information holding means 610 and mounts the media of the same media group also in the new library 4000'. Further, the means 607 recovers the operation from the degeneration operation to the normal operation and records it in the configuration information holding means 610. All of the media stored in the libraries are recorded as usable media in the configuration information holding means 610. Subsequently, the recovery to the normal operation is notified to the host computer 1 and the recovery from the library failure state is finished (1016).

The method of performing the process for moving the medium to the correct location (sorting process) by using the heuristic method is described above. Another method can be also employed in such a manner that the media group information of all of the media is read, the present storage location and a regular storage location of each of the media are recognized, and after that, a sorting process is executed by using an algorithm such as known "quick sort".

According to the embodiment as mentioned above, the time the operator has to be present for the insertion of all of the media is shortened and the same effect as that of the first embodiment can be realized.

Third embodiment (method in which a human inserts media, and later, an apparatus checks and sorts the media)

The method in which all of the media are sequentially inserted one by one by a human is shown in the second embodiment. Although the user's burden and time for presence can be reduced more than the first embodiment, there is still a problem that the user has to insert a number (hundreds) of media and long presence time is required. As a third embodiment, a method of reducing time for insertion is shown.

According to the method, all of the media are taken out from the library when the failed library 400 is detached and the user stores the media into the new library 400' off-line. After that, the new library 400' is connected and a sorting process is executed by performing the procedure from step 1023 to step 1036 in FIG. 10 of the second embodiment.

When a human stores the media, it is naturally feared that a storage mistake may occur. However, by using the method of sorting in the second embodiment as well, even if there is a storage mistake, it can be corrected later.

According to the third embodiment, the time the user inserts the media into the new library can be minimized, and moreover, the same effects as those in the first and second embodiments can be realized.

Fourth embodiment

The first to third embodiments have been described as follows. When the media are stored upon substitution of the failed library, after it is confirmed that all of the media are stored into the correct storage locations, the degeneration operation is returned to the normal operation.

According to the method, however, the time of the degeneration operation is long. There is a problem that the performance in the degeneration operation is lower than that in the normal operation. It is therefore an object to reduce the degeneration operation time of the first to third embodiments. The fourth embodiment relates to a method of reducing the degeneration operation time.

Although all of the first to third embodiments are applicable, points different from the second embodiment as a representative will be described hereinbelow.

When the provisional storage of all of the media to the new library is finished, a medium in the new library among the media group (called a present media group) used for the "on-line process" as a process of a read/write request from the host computer is searched. Specifically, the media inspection means 609 checks the present media group number with reference to the configuration information holding means 610 and checks the storage location at which the media group is stored from the information of media storage of other libraries. Subsequently, the carrying control is performed, one of the media at the checked storage locations is taken out and is loaded into the recording and reproducing apparatus 4000', the media group information is inspected, and whether the medium is a medium in the present media group or not is confirmed. If it is confirmed, it denotes that the recovery of the present media group is completed and the degeneration operation is returned to the normal operation at the time point.

If it is found by the inspection that the loaded medium is not a medium in the present media group, the media provisionally stored in an arbitrary order are loaded to the recording and reproducing apparatus 4000' one by one, the media group information is inspected, and the searching process is repeated with respect to all of the media until the present media group number is found. At the time point when the number is found, the degeneration operation is returned to the normal operation.

After that, when the RAIL is not frequently used during which no read/write request is sent from the host computer for a predetermined time, the rearranging process described in the second embodiment by inspecting the media storage location information of the media is performed by using the recording and reproducing apparatus of the library. When an access request is sent from the host computer during the rearranging operation, the operation may be temporarily shifted to the degeneration operation or since the storage locations of the media of the present media group are known, the media may be mounted at the time point when the access request is sent.

According to the embodiment, since a human inserts media in most of the cases when the media are stored, high possibility that the media are arranged at the same locations as before is used. Even if the order is changed, the rearranging is performed later. Consequently, there is an effect that the processing time for recovering the present media group can be largely reduced.

Although the above description is given on the basis of the second embodiment, it is the same when described on the basis of the third embodiment. In the first embodiment, if the user knows the present media group and stores the media first, a similar effect can be obtained. Even if the user does not know the present media group, by returning the operation from the degeneration operation to the normal operation when the media of the present media group are stored, although the effect is lower than the second and third embodiments, there is an effect that the average time of the degeneration operation during the media substitution work is reduced to ½ of the case where the first embodiment is solely executed.

Although the method of performing the rearrangement later is shown in the description, a method in which no rearrangement is performed can be also considered when the possibility that the media are arranged in the positions same as the previous ones is high. In this case, each time the media group to be mounted is substituted, whether the media are stored at the correct locations or not is checked. There is a disadvantage that all of the media have to be searched in the worst case if they are stored at wrong locations. If the possibility is high, however, there is an effect that the operation can be immediately returned from the degeneration operation to the normal operation after the media are provisionally stored.

Fifth embodiment

In the foregoing embodiments, as mentioned in the beginning of the description of the embodiments, the description has been given on the presumption of the RAIL of the conventional technique. The invention can be applied not only to the RAIL but also to a general redundant library in which each of recording and reproducing means, carrier means, storage means, and insertion means has arbitrary redundancy.

Figure 12:
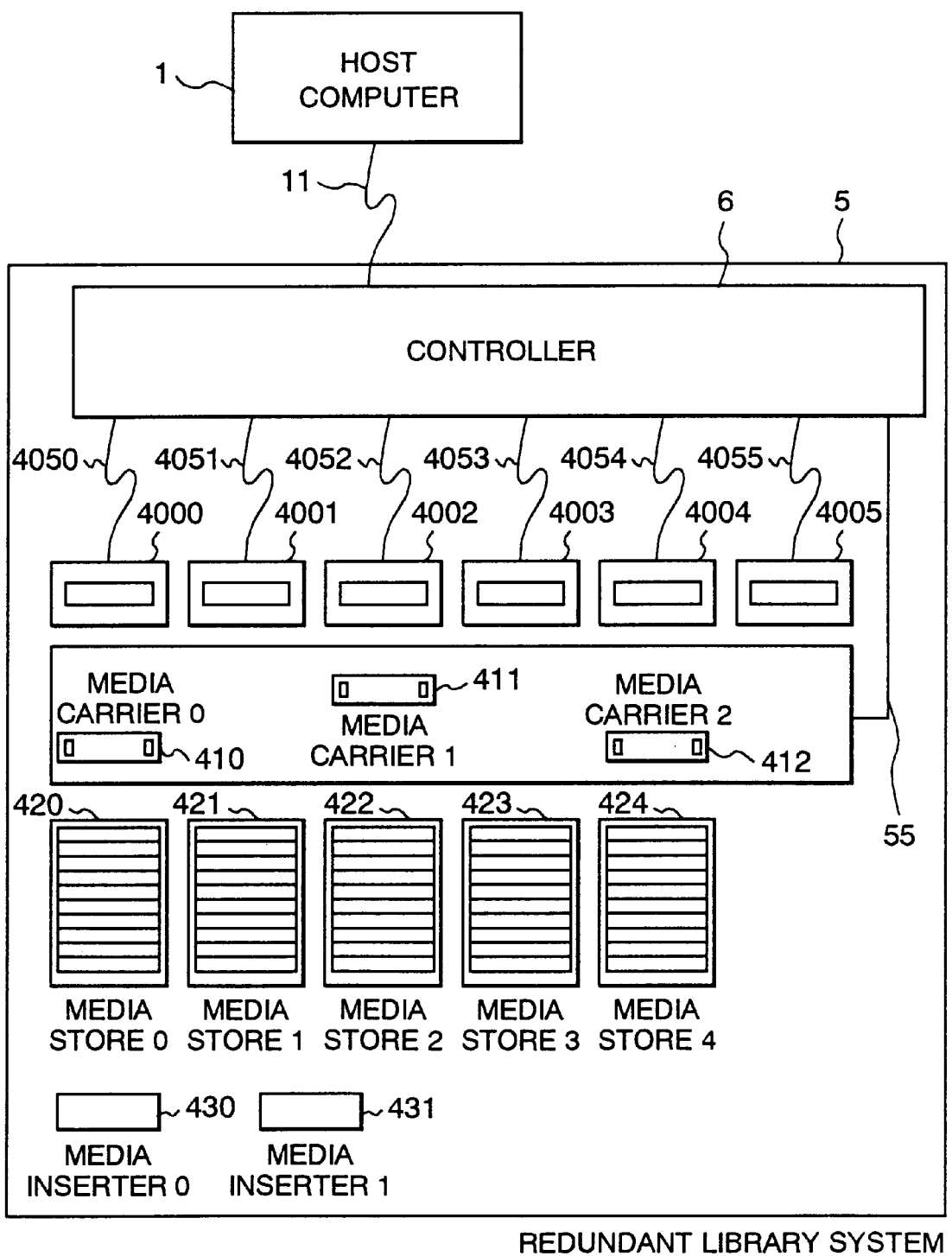
FIG. 12 is a diagram showing the configuration of a redundant library according to a fifth embodiment of the invention.

For example, as such a redundant library, there is an apparatus shown in FIG. 12. In this example, the redundant library has: a controller 6; six recording and reproducing apparatuses 4000 to 4005; three media carriers 410 to 412; five media stores 420 to 424; and two media inserters 430 and 431.

For example, it is assumed that the RAIL group is constructed by five recording and reproducing apparatuses among six of them and one of the apparatuses serves as a spare recording and reproducing apparatus. The media can be carried from arbitrary media storing units to arbitrary recording and reproducing apparatuses by total three media carriers and from arbitrary media inserters to arbitrary storage units. Since each of the recording and reproducing apparatus, the media carrier, the media store, and the media inserter has redundancy, even when a fault occurs in a means, on-line service can be continued by using other units and performing the degeneration operation.

The first to fourth embodiments can be similarly applied to such redundant libraries. When a fault in an arbitrary media store occurs, storage of the media into the correct storage locations can be realized simultaneously with substitution by a new store. When the total number of recording and reproducing apparatuses is larger than the number of recording and reproducing apparatuses constructing the RAIL group like the embodiment, it is unnecessary to shift the operation to the degeneration operation.

What is claimed is:

1. A redundant library apparatus comprising:

a plurality of recording and reproducing means arranged on an array for recording and reproducing data to/from a plurality of removable media;

a plurality of storing means arranged on an array, which have storage locations into which the plurality of removable media can be stored and which can be substituted;

at least one inserting means for inserting the removable media into the storing means;

at least one carrying means for carrying the removable medium among the inserting means, the storing means, and the recording and reproducing means; and a controller for controlling so that the plurality of recording and reproducing means operate in parallel, wherein the plurality of media stored in the plurality of different storing means construct a "media group" as an ECC group and redundant data generated from data of at least one medium is stored into at least one other medium in the same media group, the removable media has media group information storing means for storing media group information as configuration information of the media group in a specific logical address, the media group information storing means comprises:

a media group information identifier indicating that the media group is constructed and the media group information is stored;

a media group identification number for identifying the media group from different media groups;

a storing means number for storing a removable medium; and a media storing position number for specifying the storage location in the storing means which stores the media, the controller includes:

host connecting means for connecting a host computer;

at least one memory connecting means for connecting the plurality of recording and reproducing means;

at least one carrying means connecting means for connecting at least one carrying means;

central control means for executing an access request from the host computer and controlling respective means of the controller;

redundant data calculating means for generating redundant data of the media group and reconstructing data of a failed medium or a medium in failed storing means;

storing means failure detecting means for detecting occurrence of a failure in an arbitrary storing means; and media inspection means which controls in such a manner that when a removable medium is substituted together with substitution of the failed storing means by new storing means, the media storage location number in the media group information stored in each removable medium is referred to, and the removable medium is stored into the storage location shown by the number.

2. A method of substituting a removable medium when a failure occurs in the storing means in the redundant library apparatus according to claim 1 by a new library, wherein when the storage means failure detecting means detects a failure in an arbitrary storing means, the controller performs degeneration operation in which the redundant data calculating means reproduces data of a removable medium stored in the failed storing means from data and a parity stored in removable media of the removable media group stored in other storing means, and when at least one of plurality of recording and reproducing means is allocated for removable media inspection and the media inspection means moves the removable media in the failed storing means into new storing means by using at least one of the plurality of recording and reproducing means allocated for removable media inspection, the controller executes inspection of the removable media and storage to the correct location in parallel during an "on-line process" for executing reading/writing operation instructed by a host computer in degeneration operation by referring to the media group information stored in the removable medium.

3. A method of substituting media in the redundant library apparatus according to claim 1 for storing a removable medium in failed storing means into new storing means, comprising:

a step of detecting a failure in an arbitrary storing means;

a step of shifting the operation to degeneration operation for blocking the failed storing means and performing reading/writing operation while reproducing data of the removable medium in the failed storing means from data and a parity of removable media in other normal storing means;

a step of substituting the failed storing means by new storing means;

a step of inserting one of the removable media stored in the failed storing means into the inserting means;

a step of carrying the inserted removable medium by the carrying means, loading the medium into one of the plurality of recording and reproducing means, and inspecting the media storage location number stored in the removable medium;

a step of carrying and storing the inserted removable medium in the storage location in the storing means indicated by the inspected media storage location number;

a step of confirming the end of storage of all of the removable media into the new storing means, and if the storage is not finished, repeating the steps from the insertion to storage of the removable media;

a step of carrying removable media belonging to the media group in the degeneration operation which are presently loaded in the plurality of recording and reproducing means among the removable media stored in the new storing means and loading the carried removable media to a recording and reproducing means which is not used in the degeneration operation; and a step of returning the operation from the degeneration operation to normal operation.

4. A method of substituting media in the redundant library apparatus according to claim 1 for storing a medium in failed storing means into new storing means, comprising:

a step of detecting a failure in an arbitrary storing means;

a step of shifting the operation to degeneration operation for blocking the failed storing means and performing reading/writing operation while reproducing data of the removable medium in the failed storing means from data and a parity of removable media in other normal storing means;

a step of substituting the failed storing means by new storing means;

a step of sequentially continuously inserting all of the removable media stored in the failed storing means into new storing means and provisionally storing into storage locations in the new storing means;

a step of carrying and loading one of the provisionally stored removable media into a recording and reproducing means and inspecting the media storage location number stored in the removable medium;

a step of temporarily saving a removable medium when there is the removable medium provisionally stored in the storage location indicated by the inspected media storage location number;

a step of carrying and finally storing the inspected removable medium in the storage location indicated by the inspected media storage location number;

a step of inspecting all of the removable media provisionally stored in the new storing means, confirming the end of final storage into the designated storage locations, and repeats the steps from the inspection of the removable media to the final storage if the final storage is not finished;

a step of carrying removable media belonging to the media group in the degeneration operation presently loaded in the plurality of recording and reproducing means among the removable media stored in the new storing means and loading the carried removable media to a recording and reproducing means which is not used in the degeneration operation; and a step of returning the operation from the degeneration operation to normal operation.

5. A method of substituting media in the redundant library apparatus according to claim 1 for storing a medium in failed storing means into new storing means, comprising:

a step of detecting a failure in an arbitrary storing means;

a step of shifting the operation to degeneration operation for blocking the failed storing means and performing reading/writing operation while reproducing data of the removable medium in the failed storing means from data and a parity of removable media in other normal storing means;

a step of detaching the failed storing means, provisionally storing all of removable media stored in the failed storing means into new storing means, and connecting the new storing means to the redundant library apparatus;

a step of carrying and loading one of the removable media provisionally stored in the new storing means into a recording and reproducing means and inspecting the media storage location number stored in the removable medium;

a step of temporarily saving a removable medium when there is the removable medium provisionally stored in the storage location indicated by the inspected media storage location number;

a step of carrying and finally storing the inspected removable medium into the storage location indicated by the inspected media storage location number;

a step of inspecting all of the removable media provisionally stored in the new storing means, confirming the end of final storage of all of the media into the designated storage locations, and repeats the steps from the inspection of the removable media to the final storage if the storage is not finished;

a step of carrying removable media belonging to the media group in the degeneration operation presently loaded in the plurality of recording and reproducing means among the plurality of removable media stored in the new storing means and loading the carried removable media to a recording and reproducing means which is not used in the degeneration operation; and a step of returning the operation from the degeneration operation to normal operation.

6. A method of substituting media in the redundant library apparatus according to claim 1 for storing a medium in failed storing means to new storing means, comprising:

a step of detecting a failure in an arbitrary storing means;

a step of shifting the operation to degeneration operation for blocking the failed storing means and performing reading/writing operation while reproducing data of the removable medium in the failed storing means from data and a parity of removable media in other normal storing means;

a step of detaching the failed storing means and connecting new storing means to the redundant library apparatus;

a step of provisionally storing all of the removable media stored in the failed storing means into the new storing means;

a step of inspecting the number of a present media group stored in the recording and reproducing means for processing read/write requests at that time point;

a step of searching the removable media belonging to the present media group among the removable media provisionally stored in the new storing means;

a step of carrying and loading the searched removable media belonging to the present media group into a recording and reproducing means;

a step of returning the step from the degeneration operation to normal operation;

a step of temporarily loading another removable medium to the recording and reproducing means at arbitrary timing after the return to the normal operation, reading the media group information, and checking if the storage location is correct;

a step of temporarily saving a removable medium if provisionally saved in the storage location indicated by the inspected media storage position number;

a step of carrying and finally storing the inspected removable medium to the storage location indicated by the inspected media storage location number; and a step of inspecting all of the removable media provisionally stored in the storing means, confirming that the final storage to the designated storage locations is completed, and repeating the steps from the inspection of the removable media to the final storage if the final storage is not completed.

7. A removable medium for use in a redundant library apparatus comprising:

a plurality of recording and reproducing means arranged on an array for recording and reproducing data to/from a plurality of removable media;

a plurality of storing means arranged on an array, which have storage locations into which the plurality of removable media can be stored and which can be substituted;

at least one inserting means for inserting the removable media into the storing means;

at least one carrying means for carrying the removable medium among the inserting means, the storing means, and the recording and reproducing means; and a controller for controlling so that the plurality of recording and reproducing means operate in parallel, wherein the plurality of media stored in the plurality of different storing means construct a "media group" as an ECC group and redundant data generated from data of at least one medium is stored into at least one other medium of the same media group, the removable medium has media group information storing means for storing media group information as configuration information of the "media group" as an ECC group constructed by the plurality of removable media stored in the plurality of different storing means in a specific logical address, and the media group information storing means comprises:

a media group information identifier indicating that the medium belong to the media group and the media group information is stored;

a media group identification number for identifying the media group from different media groups;

a storing means number for storing a removable medium; and a media storing position number for specifying the storage location in the storing means which stores the removable media.

8. A redundant library apparatus comprising:

a plurality of libraries arranged in an array for storing a plurality of removable media;

a plurality of recording and reproducing means arranged on an array for recording and reproducing data to/from the plurality of removable media; and a controller for controlling so that the plurality of recording and reproducing means operate in parallel, in which a plurality of media stored in the plurality of different libraries construct a "media group" as an ECC group, and redundant data generated from data of at least one medium is stored into at least one other medium in the same media group, wherein the media has media group information storing means for storing media group information as configuration information of the "media group" constructed by the plurality of media in a specific logical address, the media group information storing means comprises:

a media group information identifier indicating that the medium is an element of the media group and the media group information is stored;

a media group identification number for identifying the media group from different media groups;

a library number used for storing a medium; and a media storing position number for specifying the storage location in the library which stores the medium, the library apparatus comprises:

storing means having storage locations in which the plurality of removable media can be stored;

inserting means for inserting the removable media into the library apparatus; and carrying mens for carrying the removable media among the inserting means, the storing means, and the recording and reproducing means, the controller includes:

host connecting means for connecting a host computer;

at least one memory connecting means for connecting the plurality of recording and reproducing means;

at least one carrying means connecting means for connecting at least one carrying means of the plurality of libraries;

central control means for executing an access request from the host computer and controlling respective means of the controller;

redundant data calculating means for generating redundant data of the media group and reconstructing data of a failed medium or a failed library;

library failure detecting means for detecting occurrence of a failure in an arbitrary library; and media inspecting means for referring to the media storage location numbers of the media group information stored in the media and controlling the library so as to store the media into the storage locations indicated by the numbers when the media are substituted together with substitution of the failure library by a new library.

* * * * *